(12) United States Patent
Shen et al.

(10) Patent No.: US 8,199,466 B2
(45) Date of Patent: Jun. 12, 2012

(54) HOUSING ASSEMBLY FOR A PORTABLE ELECTRONIC DEVICE

(75) Inventors: Jun Shen, Shenzhen (CN); Ping Gao, Shenzhen (CN)

(73) Assignees: Shenzhen Futahong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 222 days.

(21) Appl. No.: 12/765,433

(22) Filed: Apr. 22, 2010

(65) Prior Publication Data
US 2011/0157782 A1 Jun. 30, 2011

(30) Foreign Application Priority Data
Dec. 30, 2009 (CN) .......................... 2009 1 0312806

(51) Int. Cl.
*G06F 1/16* (2006.01)
(52) U.S. Cl. ................... 361/679.01; 439/159; 248/678; 312/409

(58) Field of Classification Search .................. 439/660, 439/345, 607.1, 78, 159, 352; 361/752, 679.01, 361/679.05, 679.09, 679.21, 679.26, 679.27, 361/679.46, 679.2, 679.6, 679.3; 248/553, 248/286.1, 295.11, 678, 346.2; 174/254, 174/535, 119 R, 483, 347; 312/223.2, 208.4, 312/215, 242, 403, 259, 409; 165/200, 287
See application file for complete search history.

(56) References Cited

U.S. PATENT DOCUMENTS
5,959,842 A * 9/1999 Leonard et al. ............... 361/752
2003/0176111 A1 * 9/2003 Iida et al. ...................... 439/660
* cited by examiner

*Primary Examiner* — Hung Duong
(74) *Attorney, Agent, or Firm* — Altis Law Group, Inc.

(57) ABSTRACT

A housing assembly for a portable electronic device includes a shell including a supporting portion, a frame, and a latching member. The latching member includes a body portion, at least one positioning portion and at least one bent portion. The body portion is disposed on the shell. The positioning portion is secured in the shell. The bent portion engages the frame. The supporting portion of the shell resists the positioning portion of the latching member.

9 Claims, 6 Drawing Sheets

HOUSING ASSEMBLY FOR A PORTABLE ELECTRONIC DEVICE

BACKGROUND

1. Technical Field

The disclosure generally relates to device housings, and particularly to a compact and easily assembled housing assembly for a portable electronic device.

2. Description of Related Art

Widely used methods of assembling a housing for a portable electronic device include using screws or other fasteners, or, alternatively, use of press-fit structures.

However, use of fasteners is time-consuming, and force applied to individual fasteners is rarely uniform, with stress generated on structural materials of the housing.

Press-fitting structures, however, while simplifying assembly considerably, can easily loosen with use, impairing the integrity of the housing.

Therefore, there is room for improvement within the art.

BRIEF DESCRIPTION OF THE DRAWINGS

Many aspects of the housing assembly can be better understood with reference to the following drawings. The components in the drawings are not necessarily drawn to scale, the emphasis instead being placed upon clearly illustrating the principles of the housing assembly.

DETAILED DESCRIPTION

Figure 1:
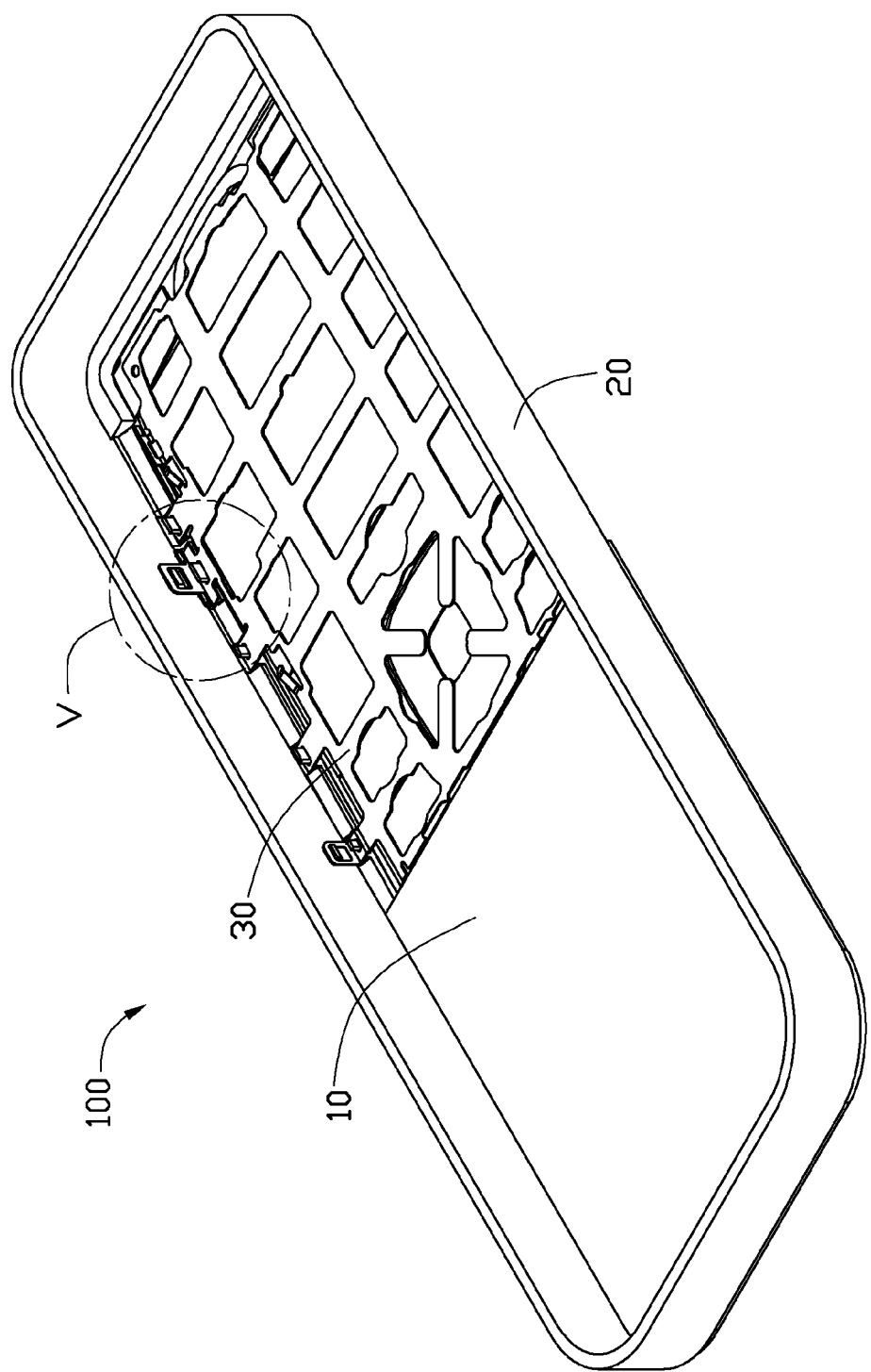
FIG. 1 is a schematic view of a first embodiment of a housing assembly for a portable electronic device, according to the disclosure.

Referring to FIG. 1, a housing assembly 100 for a portable electronic device such as a mobile phone includes a shell 10, a frame 20 and a latching member 30. The frame 20 is assembled to the shell 20 by the latching member 30.

Figure 2:
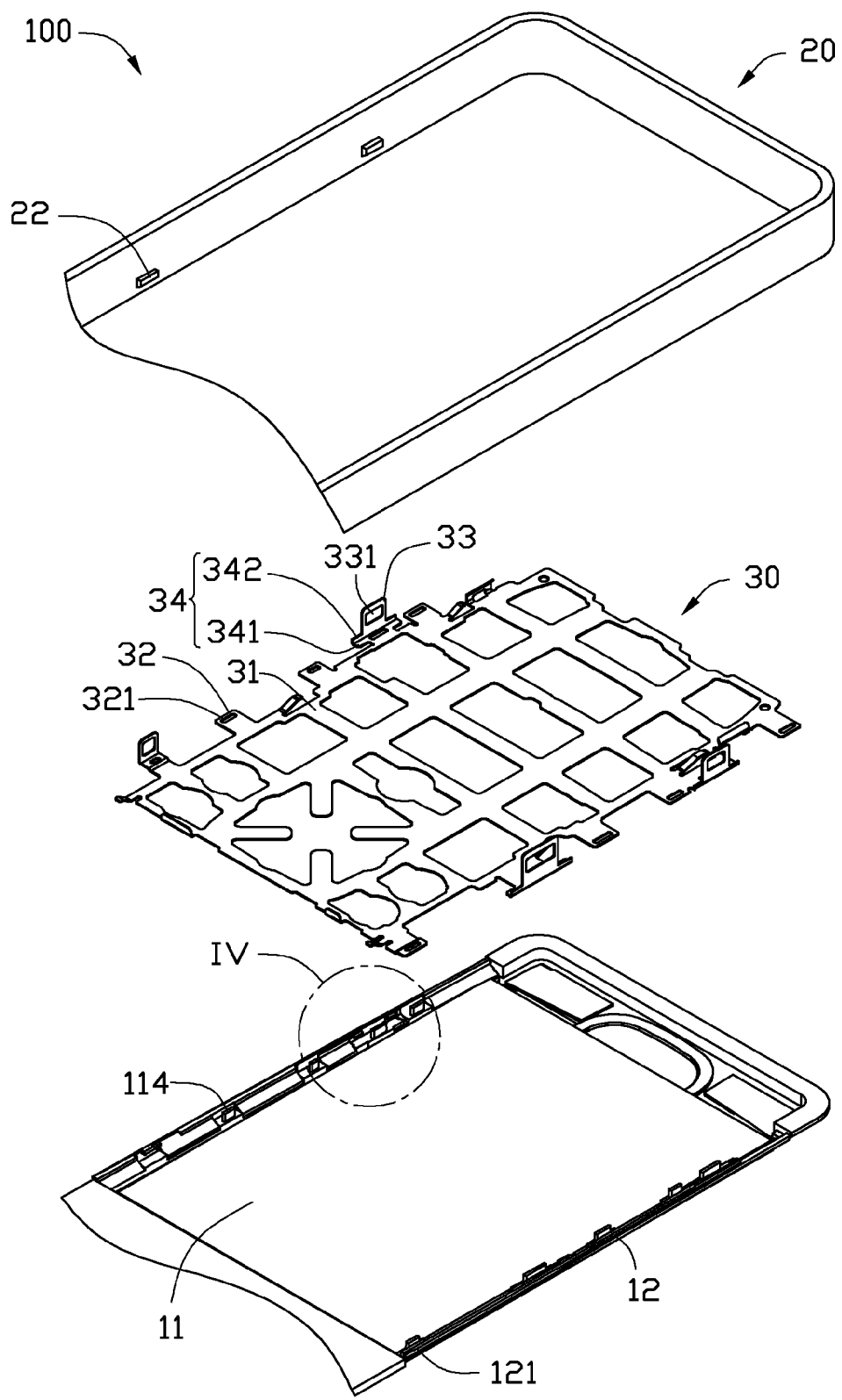
FIG. 2 is an exploded perspective view of the housing assembly of FIG. 1.
Figure 3:
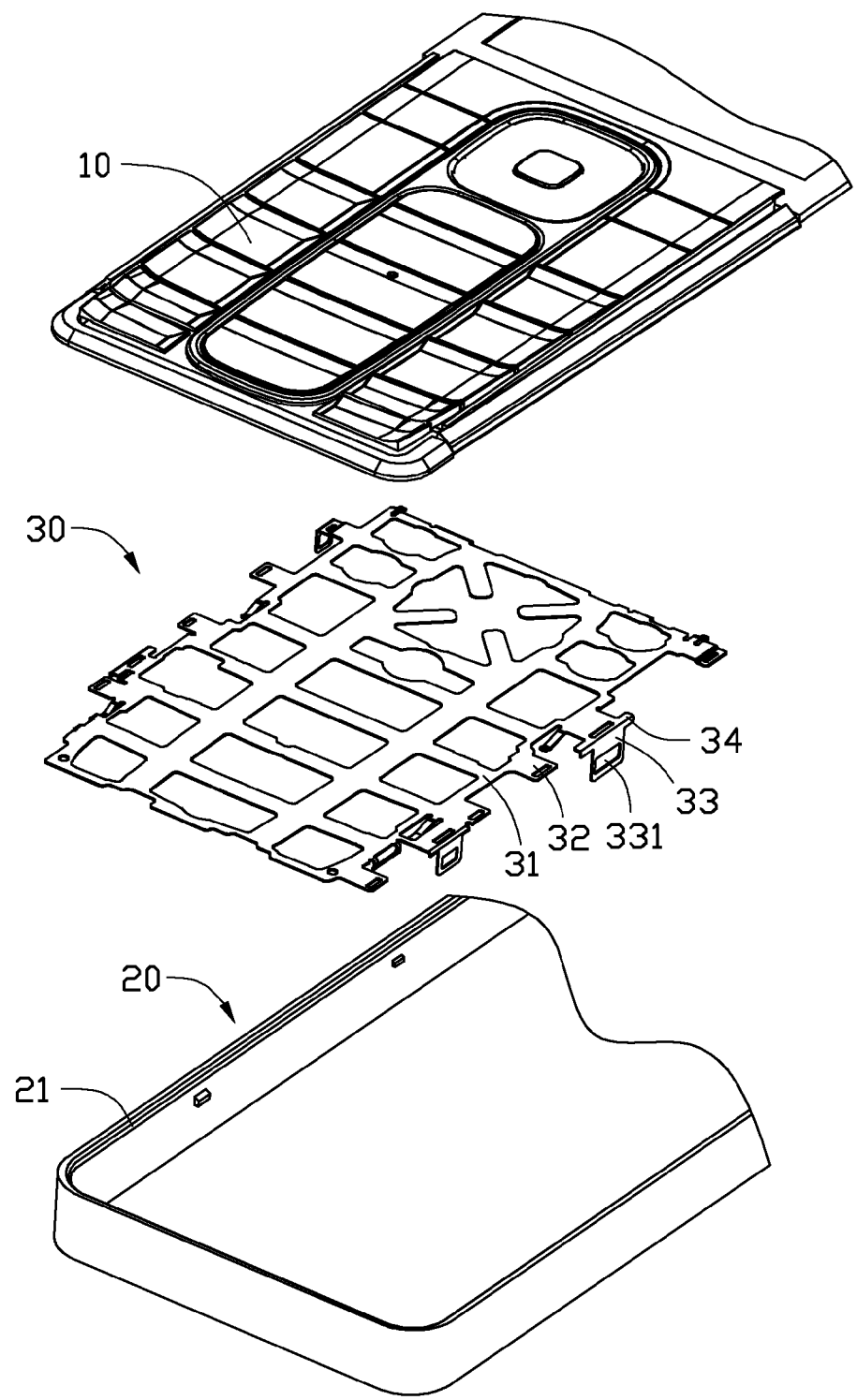
FIG. 3 is similar to FIG. 2, but viewed from another aspect.

Referring to FIGS. 2 and 3, the shell 10 may be a portion of a front cover of the portable electronic device. The shell 10 includes a bottom surface 11 and two opposite sidewalls 12 connected to the bottom surface 11 by an inclined surface (not labeled) therebetween. A plurality of supporting portions 112 (best shown in FIG. 4) with flat surfaces are disposed in the inclined surface. A positioning pole 114 protrudes from each supporting portion 112. The outer surface of an edge of each sidewall 12 is recessed to form a step-like mounting edge 121. A plurality of blocks 122 (best shown in FIG. 4) protrude from the inner surface of the sidewall 12. Every two blocks 122 are above a supporting portion 112, and correspond to two ends of the supporting portion 112.

The frame 20 may be configured to seat a keypad or other housing of the portable electronic device. A matching portion 21 extends from edges of the frame 20, corresponding to the mounting edge 121 to assemble the frame 20 to the shell 10. Two hooks 22 protrude from two opposite inner sides of the frame 20.

The latching member 30, which may be a keypad of the portable electronic device, includes a body portion 31, a plurality of positioning portions 32, and a plurality of bent portions 33. The body portion 31 can be substantially rectangular. The body portion 31 corresponds to and can be disposed on the bottom surface 11. A plurality of receiving holes (not labeled) is defined in the body portion 31 to mount keys. Each positioning portion 32 extends from edges of the body portion 31 with a positioning hole 321 defined therein. The positioning holes 321 correspond to the positioning poles 114. Each bent portion 33 extends from an end of the positioning portion 32 and perpendicularly bent to the body portion 31. A latching hole 331 is defined in the bent portion 33, and receives the hook 22 to assemble the frame 20 to the shell 10.

A plurality of extending portions 34 extends from two sides of part of connections of the positioning portions 32 and the bent portions 33. In this embodiment, the extending portions 34 are disposed at two connections of the positioning portions 32 and the bent portions 33 on the cross of the body portion 31. Each extending portion 34 is substantially L-shaped and includes a first extending end 341 and a second extending end 342 connected perpendicular to the first extending end 341. The first extending end 31 and the second extending end 32 respectively extend from one side of the positioning portion 32 and the bent portion 33. The extending portions 34 correspond to the supporting portions 112 and the blocks 122. When the frame 20 is assembled to the shell 10 by the latching member 30, the first extending end 341 is supported by the supporting portion 112, and the second extending end 342 is positioned by the blocks 122.

Figure 4:
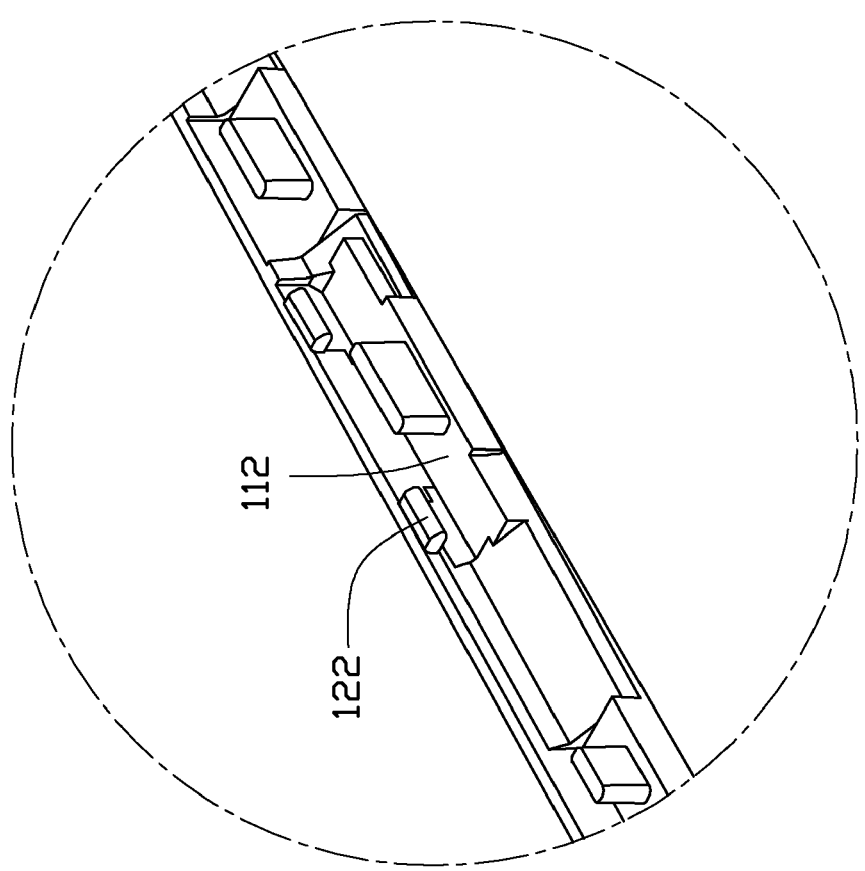
FIG. 4 is an enlarged view of a circled portion IV of FIG. 2.
Figure 5:
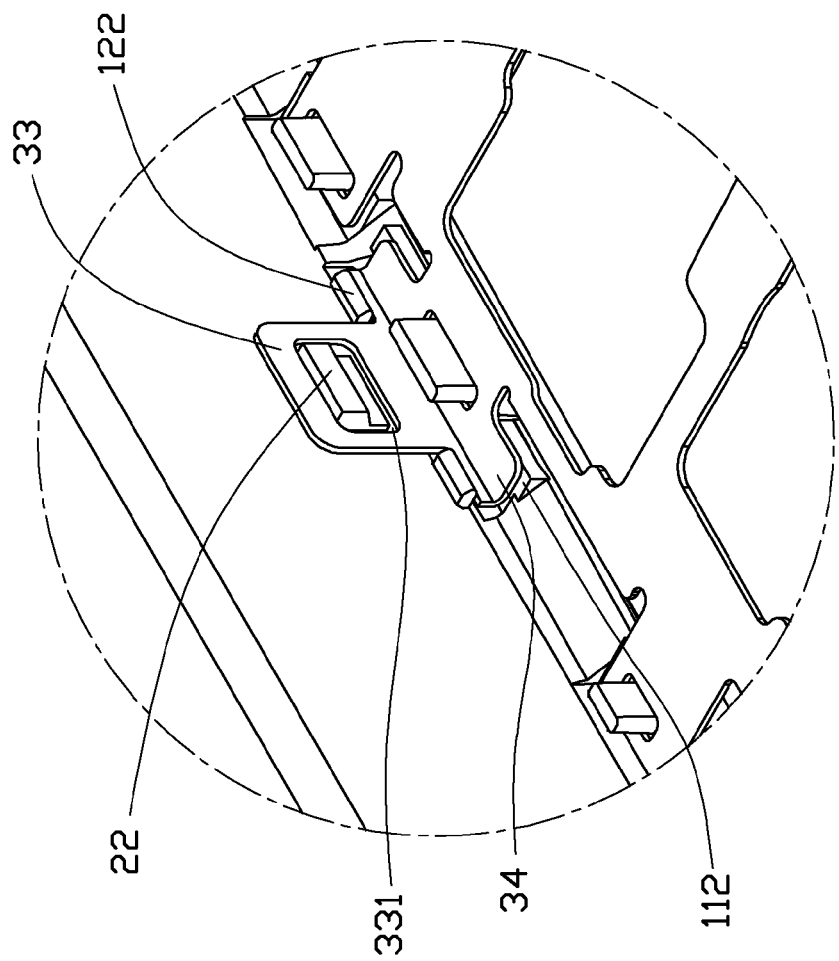
FIG. 5 is an enlarged view of a circled portion V of FIG. 1.

Referring to FIGS. 4 and 5, during assembly, the matching portion 21 of the frame 20 is aligned with the mounting edge 121 of the shell 10. The body portion 31 of the latching member 30 is disposed on the bottom surface 11 with the positioning poles 114 received in the corresponding positioning holes 321. The body portion 31 is secured in the bottom surface 11 of the shell 10 by the positioning poles 114 by a hot-melt process. Also, the hooks 22 of the frame 20 are received in the latching hole 331 of the bent portion 33. The extending portions 34 are positioned by the blocks 122.

The housing assembly 100 as disclosed provides simple assembly. In addition, the latching member 30 is part of keypad and can reduce cost of the portable electronic device. Furthermore, the supporting portion 112 of the shell 10 resists the positioning portion 32 of the latching member 30 to reduce the effect of the hook 22, and the blocks 122 position the extending portion 42 to prevent the latching member 30 from separating from the bottom surface 11 of the shell 10. Accordingly, the assembly of the shell 10 and frame 20 is compact. The supporting portions 112 may be made of flexible material to enable a compact assembly.

Figure 6:
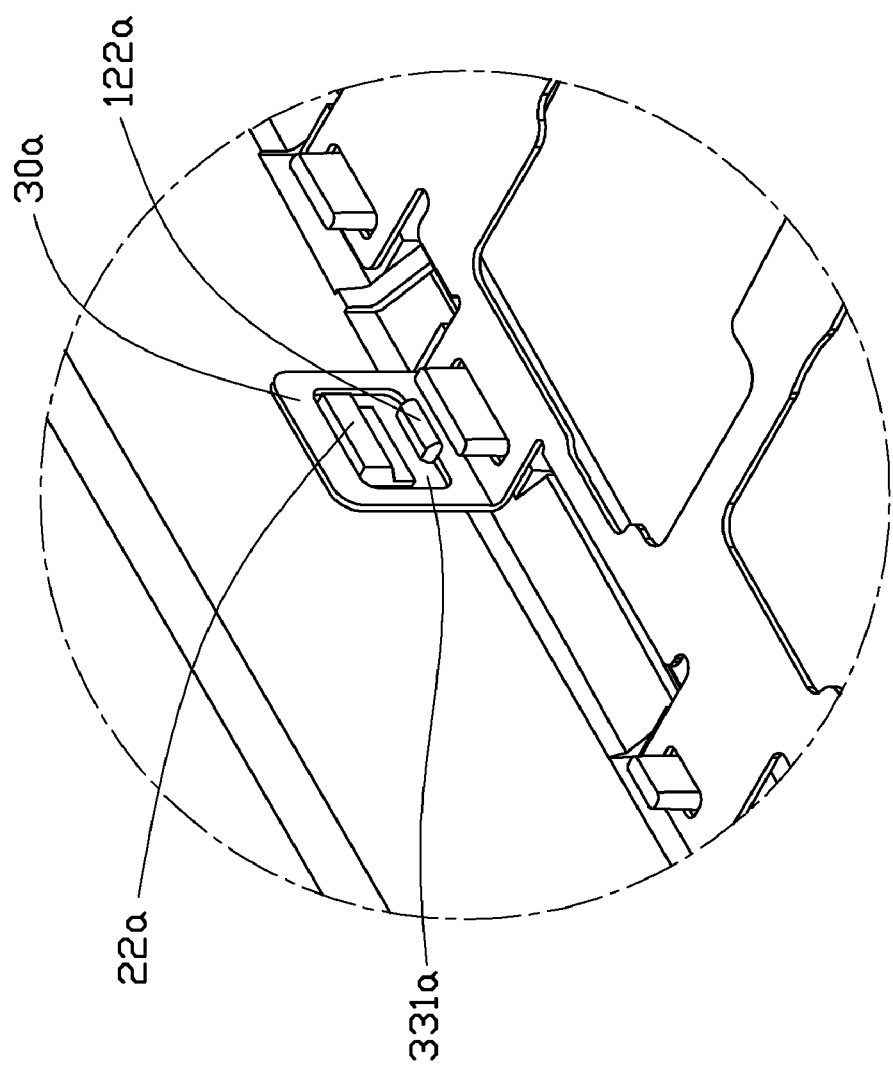
FIG. 6 shows a second embodiment of a housing assembly for a portable electronic device, according to the disclosure.

Referring to FIG. 6, a second embodiment of a housing assembly for a portable electronic device differs from the first embodiment only in that a latching member 30a of the housing assembly is without the extending portion 34, and a block 122a is disposed corresponding to a latching hole 331a. A hook 22a and the block 122a are both received in the latching hole 331a at two opposite sides to prevent the latching member 30 from separating from the bottom surface 11 of the shell 10.

It is believed that the exemplary embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A housing assembly for portable electronic device, comprising:
   a shell including a supporting portion;
   a frame; and
   a latching member including a body portion, at least one positioning portion and at least one bent portion; wherein the body portion is disposed on the shell, the positioning portion is secured in the shell, the bent portion engages the frame, and the supporting portion of the shell resists the positioning portion of the latching member.

2. The housing assembly as claimed in claim 1, wherein the positioning portion extends from the body portion, and the bent portion is bent from one end of the positioning portion.

3. The housing assembly as claimed in claim 1, wherein the shell includes a bottom surface and two opposite sidewalls connected to the bottom surface; wherein a positioning pole protrudes from each supporting portion and corresponds to the positioning portion.

4. The housing assembly as claimed in claim 3, wherein a mounting edge is formed on an edge of the shell, and a matching portion extends from edges of the frame corresponding to the mounting edge.

5. The housing assembly as claimed in claim 4, wherein a plurality of hooks protrudes from the frame, and each bent portion defines a latching hole in which each hook is correspondingly received.

6. The housing assembly as claimed in claim 5, wherein the latching member further includes at least an extending portion extending from a connection of the positioning portions and the bent portions, and a plurality of blocks protrudes from the sidewalls of the shell, the extending portion positioned by the blocks.

7. The housing assembly as claimed in claim 5, wherein a plurality of blocks protrudes from the sidewalls of the shell, and a block and a hook are both received in a corresponding latching hole at two opposite sides.

8. The housing assembly as claimed in claim 1, wherein the latching member is a keypad.

9. The housing assembly as claimed in claim 1, wherein the supporting portion is flexible material.

* * * * *